United States Patent [19]

Rosenkranz et al.

[11] 4,076,071
[45] Feb. 28, 1978

[54] METHOD FOR HEATING PLASTICS MATERIALS

[75] Inventors: Otto Rosenkranz, Hamburg; Heinz Goos, Schenefeld; Karl-Heinrich Seifert, Hamburg, all of Germany

[73] Assignee: Heidenreich & Harbeck Zweigniederlassung der Gildemeister AG, Hamburg, Germany

[21] Appl. No.: 516,904

[22] Filed: Oct. 22, 1974

[30] Foreign Application Priority Data

Oct. 22, 1973 Germany .............................. 2352926

[51] Int. Cl.$^2$ ...................... F25B 13/00; B28B 11/08
[52] U.S. Cl. .......................................... 165/2; 165/30; 425/40; 425/384; 425/393
[58] Field of Search ................... 165/2, 30; 425/384, 425/392, 393, 403, 40; 264/DIG. 5

[56] References Cited

U.S. PATENT DOCUMENTS

| | | | |
|---|---|---|---|
| 3,004,289 | 10/1961 | Missbach | 425/384 |
| 3,126,580 | 3/1964 | Paschke | 425/384 |
| 3,314,110 | 4/1967 | Missbach | 425/384 |
| 3,533,352 | 10/1970 | Miller | 425/384 |
| 3,635,639 | 1/1972 | Krebsbach | 425/384 |

*Primary Examiner*—Charles J. Myhre
*Assistant Examiner*—Daniel J. O'Connor
*Attorney, Agent, or Firm*—Cullen, Settle, Sloman & Cantor

[57] ABSTRACT

Workpieces of a synthetic plastics material are heated to enable further moulding thereof to be effected. Heating is effected by infra-red radiators and, in order to ensure that localized overheating is avoided, the surface of the workpiece which is exposed to radiation is cooled during the heating process.

4 Claims, 8 Drawing Figures

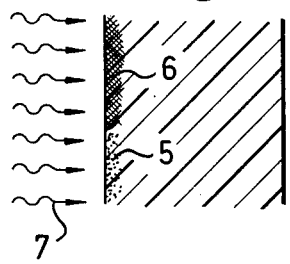
Fig. 1
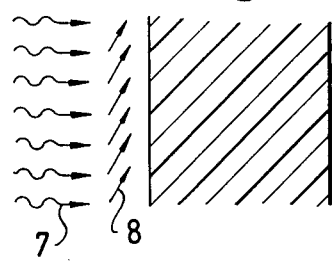
Fig. 2
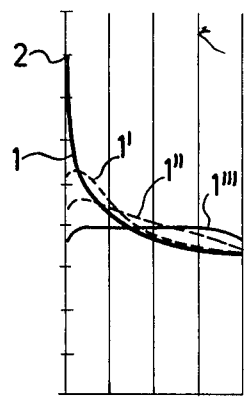
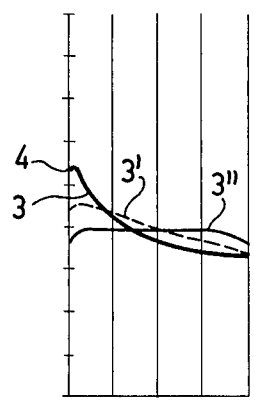
Fig. 7
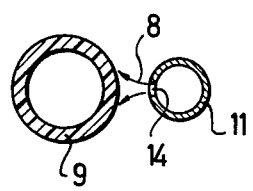
Fig. 4
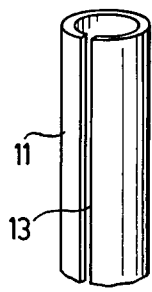
Fig. 5
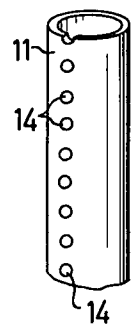
Fig. 6
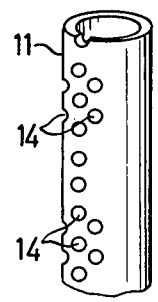
Fig. 8
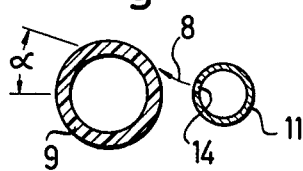

METHOD FOR HEATING PLASTICS MATERIALS

FIELD OF THE INVENTION

This invention relates to a method and apparatus for heating plastics materials.

BACKGROUND OF THE INVENTION

It is known to heat synthetic plastics materials by infra-red radiation to enable moulding thereof to be effected. Preferably, infra-red radiators which permit very short heating periods, lasting only a few seconds but of great intensity are used for this purpose. Infra-red radiation offers the advantage that it is not only the surface of the irradiated plastics material that is heated but that the deeper layers are also directly reached through the surface. Nevertheless, the radiation is predominantly absorbed by that portion of the material that is nearest to the source of radiation and thus, with intensive irradiation, a high-temperature peak is thereby caused on the irradiated surface. Due to the low thermal conductivity of plastics materials, a temperature balance within the material occurs, in the case of infra-red radiation, only relatively slowly during the short heating period.

This lack of temperature balance frequently leads to undesired changes in the overheated surface layer, particularly when workpieces with a large wall thickness have to be heated for a somewhat longer time than usual, in order to introduce the necessary quantity of thermal energy into the workpiece.

An object of the invention is to prevent changes in the surface layer, caused by an unnecessarily high degree of heating, in thick-walled workpieces of plastics material which are to be heated to enable subsequent moulding thereof to be effected.

SUMMARY OF THE INVENTION

According to the invention, the surface of the workpiece which is exposed to radiation is cooled during the heating process.

As a result of simultaneous cooling during the heating process no high-temperature peaks occur in the surface layer of the wall of the workpiece.

BRIEF DESCRIPTION OF THE DRAWINGS

FIG. 1 illustrates infra-red radiation of a synthetic plastics material without simultaneous cooling and the resulting temperature distribution curve, FIG. 2 illustrates radiation with simultaneous cooling and the resulting temperature distribution curve, FIGS. 4 to 6 show alternative forms of cooling means, and FIGS. 7 and 8 illustrate alternative methods of directing the coolant flow on to a workpiece.

DESCRIPTION OF THE PREFERRED EMBODIMENTS

Figure 3:
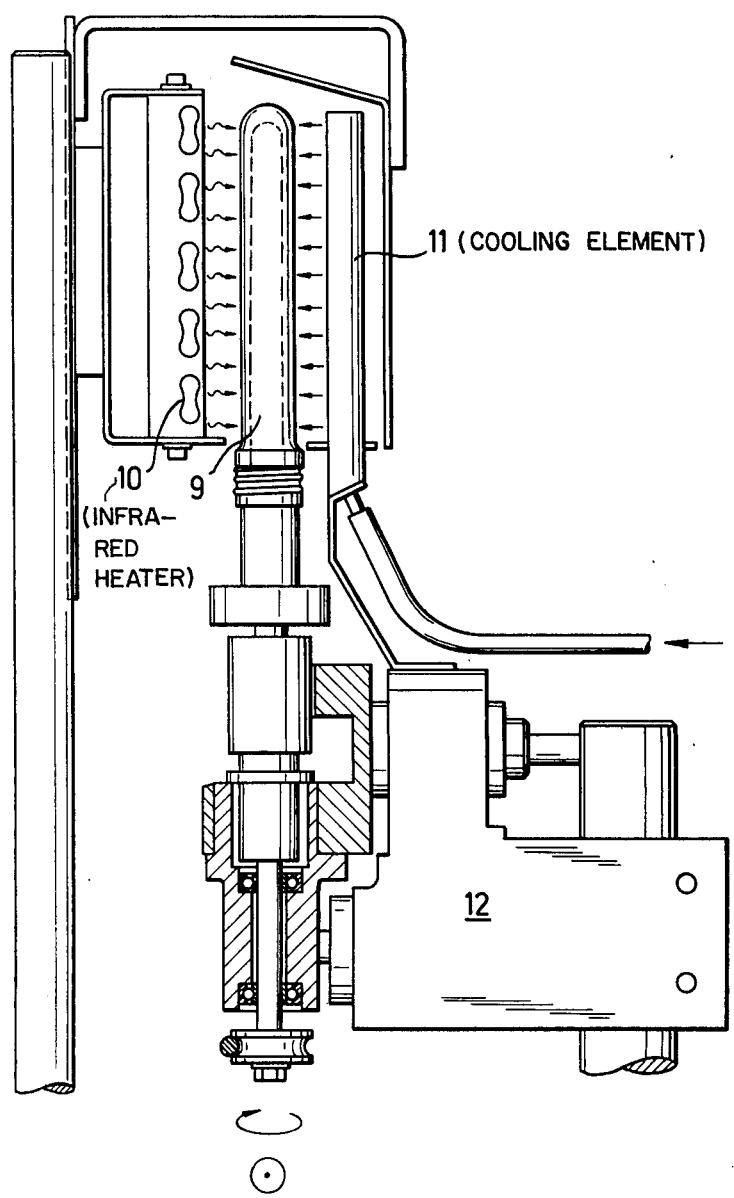
FIG. 3 shows apparatus for use in carrying out the method of the invention.

When thermoplastic materials are processed into products which are required in large quantities, it is necessary to make full use of the properties of the material. It is desirable to obtain the maximum strength and service life using a minimum of material. In the case of certain plastics materials, special advantages can be achieved gy orientation of the material.

Infra-red radiation is eminently suitable for re-heating. It enables the plastics material to be heated not only at its surface but simultaneously over its entire depth in a few seconds. Through the absorption characteristic of thermoplastics a more intense heating occurs in the surface layers which face the radiation source. As can be seen from FIG. 1 a temperature distribution develops which is determined by the radiation temperature and the specific absorbing properties of the plastics material. The more intense the irradiation, the higher is the temperature peak at 2. Depending on the material that is to be processed, this can cause an undesired change in or damage to the affected layer, as is shown in FIG. 1 at 5 and 6, since the thermal conductivity of thermoplastics is relatively low and the temperature balance within the wall is not achieved immediately but occurs only after some time, as is evident from the lines 1', 1'', 1''' which show the temperature distribution at predetermined time intervals after the irradiation process has been completed. This phenomenon is of particular significance in the case of relatively large wall thickness, for example of more than 3 mm. The improvement of the properties of the material in thermoelastic processing increases considerably with an increase in the extent by which the material can be stretched; for example, stretching by more than ten times is possible in the case of saturated polyethylene terephthalate (PET) and materials which behave in a similar manner. In order to achieve specific properties, more especially in the case of pressure tanks, it may be necessary to start with a blank having a wall thickness that is more than 3 mm.

As is known, PET is highly transparent in its amorphous and orientated state. Through crystallisation PET becomes opaque and brittle. The rate of cyrstallisation reaches its maximum at temperatures around 150° C. During the heating process by infra-red radiation, in which the thermoelastic processing stage is reached, the critical temperatures in the vicinity of the surface can be present for such a length of time that an at least partial crystallisation as indicated at 5 and 6 occurs on the surface of the originally amorphous workpieces. The consequences of this are as mentioned above, and further processing by orientation is no longer practicable to the desired or otherwise possible extent.

For example in the case of polyvinyl chloride (PVC), polyacrylonitrile, polystyrene (PS) and materials which behave in a similar manner during processing, the overheating in the irradiated surface layer brings about a release of dissolved substances and/or, by chemical changes, a release of constituents of the macromolecules. This can damage the material and/or lead to the formation of gas bubbles which impair the appearance of the workpiece that is to be produced.

In order to prevent the above-mentioned consequences of the temperature peak 2 in the irradiated surface layer, the peaks are, according to the invention, reduced by cooling the surface layer during the heating process. In FIG. 2, the infra-red radiation is designated by 8. The temperature peak 4 of the temperature profile 3 is now considerably lessened; the period before which an approximate equalization of the temperature profile 3 is achieved is likewise shorter (lines 3', 3''). Consequently, the undesired changes in the surface do not occur. In the case of PET, it is now possible to re-heat semi-finished products or blanks that have a fairly large wall thickness so that they reach the thermoelastic processing temperature within a few seconds.

Biaxial orientation of blown hollow bodies is becoming of increasing importance, but it is only an economical process, involving large quantities of materials, if an improvement of the properties of the material — i.e., higher strength, reduced gas permeability and better transparency — can be obtained. These properties are necessary in the case of pressure bottles, for example for drinks containing carbon dioxide and for aerosols. PET is now being used as a particularly suitable thermoplastic material for this purpose.

Reference will now be made to FIGS. 3 to 8.

The starting material for the process comprises cold premoulded blanks 9 with closed bottoms, which can have been manufactured according to any one of a number of known methods. For the purpose of being heated, the blanks 9 are disposed in a heating chamber which contains a plurality of infra-red radiators 10, which are arranged on one side or on several sides of the chamber. Preferably, the blanks 9 pass continuously through the heating chamber (as shown by the symbol • in FIG. 3) whilst being rotated simultaneously about their own axes. A cooling device 11 for the blanks is fastened to a support 12 on which the blanks are mounted and by means of which the blanks are guided past the radiators 10. During the heating process, the blanks are fanned by the cooling device 11, which is stationary in relation to the axes of rotation of the blanks.

In the embodiment illustrated in FIG. 4, the outflow of the preferably gaseous cooling medium that is directed on to the blanks occurs through a gap 13 in the tubular cooling device 11. In another embodiment, shown in FIG. 5, the outflow of the cooling medium can occur through a plurality of holes 14. If heating of the blanks in the longitudinal direction is to be effected in a predetermined non-uniform manner, then the holes 14 can, as shown in FIG. 6, be arranged in groups, in order to vary the intensity of the cooling medium stream in a likewise predetermined non-uniform manner. In order to increase the cooling effect of the gaseous medium, the latter can be enriched with or replaced by a liquid. In particular small droplets of liquid may be incorporated in the gas stream.

In a further embodiment, which is not shown, the heating device is in the form of a tunnel, through which a gas stream flows which cools the surface of the blanks. Furthermore, the cooling process can also be carried out using a cooling element which resiliently bears against the irradiated blank and through whose contact with the surface of the blank during irradiation heat is transmitted out of the surface layer.

To prevent any irregular cooling flow distribution and consequently irregular cooling caused by inaccurate alignment of the cooling medium stream in relation to the axes of the individual blanks, the discharge of the coolant fluid can be effected in such a way that, as shown in FIG. 7, the stream of coolant widens considerably after leaving the cooling device 11 or is, as shown in FIG. 8, blown out obliquely at an angle α. With these arrangements, slight deviations in the alignment of the blanks and the cooling device hardly become noticeable.

Processing of the plastics material occurs in the thermoelastic moulding temperature range (approximately 100° C in relation to a Melt Point of approximately 200° C).

What is claimed is:

1. A method of heating an essentially tubular thermoplastic parison, comprising the steps of placing the parison at a first temperature in a thermal conditioning zone in simultaneous heat exchange relation to both an elongated array of infra-red heating elements and a source of a gaseous coolant, displacing the parison transversely along the array of heating elements (a) while simultaneously subjecting the parison to both heat from the infra-red heating elements and a stream of gaseous coolant issuing from said source, and (b) while rotating the parison about its longitudinal axis so that the exterior surface of said parison is both heated and cooled to avoid localized overheating and consequent heat degradation of the parison surface, and then displacing the parison from the thermal conditioning zone at a second temperature greater than the first temperature, wherein the parison at the second temperature is deformable and workable.

2. A method of heating an essentially tubular parison formed of a heat degradable thermoplastic material from a temperature at which the parison is essentially non-deformable and non-workable to a temperature at which the parison is deformable and workable, comprising the steps of placing a tubular parison at a non-deformable temperature onto a laterally displaceable and rotatable carrier, laterally displacing the carrier and conveying the parison past a bank of infra-red heaters while (a) simultaneously rotating the carrier and the parison about a common longitudinal axis and (b) directing a stream of gaseous coolant onto the surface of the rotating parison to prevent overheating of the surface of the parison while facilitating heating the interior of the parison, and displacing the tubular parison from adjacent the radiant heaters at a deformable, workable temperature.

3. A method for heating an essentially tubular parison of heat degradable thermoplastic material to a deformable, workable temperature preparatory to blowing the parison to shape in a blow mold, comprising the steps of laterally conveying the preform parison in a predetermined path in heating proximity to a battery of infra-red heating elements, rotating the parison about its own axis while the preform is so being laterally conveyed, laterally conveying a source of gaseous coolant along with said preform, and directing a stream of gaseous coolant from said source against the exterior surface of the parison to prevent overheating of the parison periphery by virtue of its heating proximity to said elements, and heating the parison to a deformable, workable temperature while the parison is in heating proximity to the infra-red elements and while directing the stream of gaseous coolant onto the exterior surface of the parison.

4. A method of heating an essentially tubular parison formed of poly (ethylene terephthalate) and of appreciable wall thickness, comprising the steps of interposing the parison between an elongated array of infra-red heating elements and a tubular conduit connected to a source of gaseous coolant, the parison axis and the conduit axis being parallel, heating one side of the parison by said heating elements, directing a flow of gaseous coolant from the conduit against the opposite side of the parison, and simultaneously (1) rotating the parison about its own axis and (2) moving both the parison and the conduit longitudinally along the array of heating elements, so that the periphery of said parison is alternately subjected to heating from said elements and cooling by the flow of gaseous coolant from the conduit, whereby the exterior of the parison is cooled to prevent crystallization thereof while the remainder of the parison interiorly of the exterior thereof is heated by penetration of the infra-red thereinto.

* * * * *

REEXAMINATION CERTIFICATE (383rd)

United States Patent [19]

Rosenkranz et al.

[11] B1 4,076,071

[45] Certificate Issued  Sep. 10, 1985

[54] METHOD FOR HEATING PLASTICS MATERIALS

[75] Inventors: Otto Rosenkranz, Hamburg; Heinz Goos, Schenefeld; Karl-Heinrich Seifert, Hamburg, all of Fed. Rep. of Germany

[73] Assignee: Fried Krupp Gesellschaft mit Beschrankter Haftung, Essen, Fed. Rep. of Germany

Reexamination Request:
No. 90/000,576, Jun. 18, 1984

Reexamination Certificate for:
Patent No.: 4,076,071
Issued: Feb. 28, 1978
Appl. No.: 516,904
Filed: Oct. 22, 1974

[30] Foreign Application Priority Data

Oct. 22, 1973 [DE] Fed. Rep. of Germany ....... 2352926

[51] Int. Cl.³ .................... F25B 13/00; B28B 11/08
[52] U.S. Cl. .................................. 165/2; 165/30; 165/61; 425/40; 425/384; 425/393; 219/343; 219/411; 264/25; 264/521; 264/535; 264/538
[58] Field of Search .................... 165/64, 61, 2, 30; 219/553, 531, 201, 343, 354, 411; 264/25, DIG. 5, 521, 535, 538; 425/401, 334, 392, 393, 403

[56] References Cited

U.S. PATENT DOCUMENTS

| | | | |
|---|---|---|---|
| 3,003,409 | 10/1961 | Mills | 219/411 |
| 3,283,046 | 11/1966 | DeWitt et al. | |
| 3,284,922 | 11/1966 | Goldenberg et al. | 219/343 |
| 3,361,417 | 1/1968 | Borsvold | |
| 3,445,096 | 5/1969 | Seefluth | |
| 3,787,170 | 1/1974 | Gilbert | 264/535 |

FOREIGN PATENT DOCUMENTS

| | | | |
|---|---|---|---|
| 1816489 | 8/1970 | Fed. Rep. of Germany | 264/521 |
| 2057298 | 6/1972 | Fed. Rep. of Germany | |
| 1449350 | 7/1966 | France | |
| 1494151 | 7/1967 | France | |
| 2115161 | 7/1972 | France | |
| 86922 | 1/1957 | Netherlands | |
| 486302 | 4/1970 | Switzerland | |
| 486971 | 4/1970 | Switzerland | |
| 926589 | 5/1963 | United Kingdom | |
| 1113340 | 5/1968 | United Kingdom | |
| 1236103 | 6/1971 | United Kingdom | |
| 1236104 | 6/1971 | United Kingdom | |
| 1236636 | 6/1971 | United Kingdom | |

*Primary Examiner*—A. W. Davis, Jr.
*Attorney, Agent, or Firm*—Spencer & Frank

[57] ABSTRACT

Workpieces of a synthetic plastics material are heated to enable further moulding thereof to be effected. Heating is effected by infra-red radiators and, in order to ensure that localized overheating is avoided, the surface of the workpiece which is exposed to radiation is cooled during the heating process.

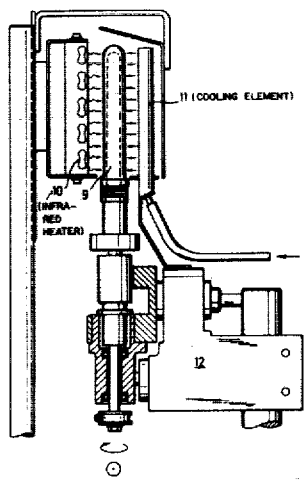

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2 lines 55–68:
In order to prevent the above-mentioned consequences of the temperature peak 2 in the irradiated surface layer, the peaks are, according to the invention, reduced by cooling the surface layer during the heating process. In FIG. 2, [the infra-red radiation is designated] *a gaseous coolant is designated* by 8. The temperature peak 4 of the temperature profile 3 is now considerably lessened; the period before which an approximate equalization of the temperature profile 3 is achieved is likewise shorter (lines 3', 3"). Consequently, the undesired changes in the surface do not occur. In the case of PET, it is now possible to re-heat semi-finished products or blanks that have a fairly large wall thickness so that they reach the thermoelastic processing temperature within a few seconds.

AS A RESULT OF REEXAMINATION, IT HAS BEEN DETERMINED THAT:

The patentability of claims 1–4 is confirmed.

\* \* \* \* \*